United States Patent
Wilhelm et al.

(10) Patent No.: US 10,369,717 B2
(45) Date of Patent: Aug. 6, 2019

(54) METHOD OF MACHINING PLATE-LIKE WORKPIECES

(71) Applicant: TRUMPF Werkzeugmaschinen GmbH + Co. KG, Ditzingen (DE)

(72) Inventors: Markus Wilhelm, Gerlingen (DE); Takeshi Abiko, Ditzingen (DE)

(73) Assignee: TRUMPF Werkzeugmaschinen GmbH+ Co. KG, Ditzingen (DE)

( * ) Notice: Subject to any disclaimer, the term of this patent is extended or adjusted under 35 U.S.C. 154(b) by 0 days.

(21) Appl. No.: 15/142,406

(22) Filed: Apr. 29, 2016

(65) Prior Publication Data
US 2016/0318202 A1   Nov. 3, 2016

(30) Foreign Application Priority Data
Apr. 29, 2015   (EP) .................................... 15165663

(51) Int. Cl.
*B26D 7/18*     (2006.01)
*B21D 28/10*    (2006.01)
(Continued)

(52) U.S. Cl.
CPC .............. *B26D 7/18* (2013.01); *B21D 28/10* (2013.01); *B23K 26/38* (2013.01); *B26F 1/38* (2013.01);
(Continued)

(58) Field of Classification Search
CPC .............. B26D 2007/1872; B26D 7/18; B26D 7/1818; B26D 2007/1809; B26D 2007/1881
(Continued)

(56) References Cited

U.S. PATENT DOCUMENTS 2,871,551 A * 2/1959 Harris .................. H01G 13/006
                                                              29/874
2,918,721 A * 12/1959 Lawson ............... B21D 22/206
                                                              29/417
(Continued)

FOREIGN PATENT DOCUMENTS

CN     101686604     3/2010
CN     201791837     4/2011
(Continued)

OTHER PUBLICATIONS

Office Action in Chinese Application No. 201610273067.1, dated Jun. 22, 2018, 13 pages (with English translation).

*Primary Examiner* — Kenneth E Peterson
(74) *Attorney, Agent, or Firm* — Fish & Richardson P.C.

(57) ABSTRACT

In the context of a method for the separating machining of plate-like work-pieces from an elastically deformable material, in particular for the separating machining of sheet metal, two workpiece parts are separated from one another, in that the two workpiece parts are initially partially separated from one another, so as to produce at least one connecting web connecting the two workpiece parts to one another, and in that the two workpiece parts are then separated from one another completely by re-moving the connection created by the connecting web. The at least one connecting web is created as a flexure bearing in this case that connects the two workpiece parts to one another in such a manner that the two workpiece parts are movable relative to one another with elastic deformation of the connecting web against the action of a restoring force.

11 Claims, 4 Drawing Sheets

(51) Int. Cl.
  *B23K 26/38* (2014.01)
  *B26F 1/38* (2006.01)
  *B26F 3/00* (2006.01)
(52) U.S. Cl.
  CPC ...... *B26F 3/004* (2013.01); *B26D 2007/1872* (2013.01)
(58) Field of Classification Search
  USPC ........................................ 83/40, 41, 46, 945
  See application file for complete search history.

(56) References Cited

U.S. PATENT DOCUMENTS

| | | | | |
|---|---|---|---|---|
| 3,107,566 A * | 10/1963 | Archer | ................... | B21D 28/06 156/261 |
| 4,106,422 A * | 8/1978 | Buhrke | ................ | B21D 51/383 413/17 |
| 4,252,864 A * | 2/1981 | Coldren | ................ | H01L 23/049 174/529 |
| 4,546,683 A * | 10/1985 | Volkel | ................ | B21D 43/287 83/103 |
| 4,904,539 A * | 2/1990 | Kling | ................ | H01R 13/7197 29/464 |
| 4,945,954 A * | 8/1990 | Wehrly, Jr. | ................ | B26F 1/14 140/105 |
| 5,931,866 A * | 8/1999 | Frantzen | ................... | A61F 2/91 623/1.15 |
| 6,083,259 A * | 7/2000 | Frantzen | ................... | A61F 2/91 623/1.15 |
| 6,099,455 A * | 8/2000 | Columbo | ............. | A61N 5/1002 600/3 |
| 6,129,754 A * | 10/2000 | Kanesaka | ............... | A61F 2/856 606/153 |
| 6,929,660 B1 * | 8/2005 | Ainsworth | ................ | A61F 2/91 623/1.15 |
| 7,249,546 B1 * | 7/2007 | Fosnaugh | .............. | B21D 28/06 83/255 |
| 7,992,475 B2 * | 8/2011 | Buettner | ................ | B21D 28/06 219/121.72 |
| 8,241,349 B2 * | 8/2012 | Davidson | .................. | A61F 2/82 623/1.15 |
| 8,337,544 B2 * | 12/2012 | Osman | ....................... | A61F 2/91 623/1.15 |
| 8,433,435 B2 * | 4/2013 | Fagan | .................... | B23K 7/105 219/121.69 |
| 8,741,092 B2 | 6/2014 | Graham | | |
| 8,961,583 B2 * | 2/2015 | Hojeibane | ................. | A61F 2/91 623/1.15 |
| 8,974,514 B2 * | 3/2015 | Anukhin | ................ | A61F 2/915 623/1.15 |
| 9,011,189 B2 * | 4/2015 | Tsukamoto | ............ | H01R 43/16 439/885 |
| 9,066,825 B2 * | 6/2015 | Chanduszko | ............. | A61F 2/90 |
| 2002/0151959 A1 * | 10/2002 | Von Oepen | ............... | A61F 2/91 623/1.15 |
| 2004/0098107 A1 * | 5/2004 | Richter | ..................... | A61F 2/91 623/1.15 |
| 2006/0096963 A1 | 5/2006 | Ito et al. | | |
| 2009/0223334 A1 * | 9/2009 | Buettner | ................ | B21D 28/06 83/39 |
| 2010/0249903 A1 * | 9/2010 | Wack | ...................... | A61F 2/915 623/1.16 |

FOREIGN PATENT DOCUMENTS

| | | | |
|---|---|---|---|
| CN | 103143842 | | 6/2013 |
| CN | 203696254 | | 7/2014 |
| EP | 0962269 A2 | | 12/1999 |
| EP | 2 253 460 | | 11/2010 |
| FR | 2979265 A1 | | 3/2013 |
| WO | WO2007010295 | * | 1/2007 |
| WO | WO2015001217 A1 | | 1/2015 |

* cited by examiner

METHOD OF MACHINING PLATE-LIKE WORKPIECES

CROSS-REFERENCE TO RELATED APPLICATION

This application claims priority under 35 U.S.C. § 119(a) to European Application No. 15 165 663.4, filed on Apr. 29, 2015, the entire contents of which are hereby incorporated by reference.

TECHNICAL FIELD

The invention relates to a method for the separating machining of plate-like work-pieces from an elastically deformable material, in particular for the separating machining of sheet metal, wherein two workpiece parts are separated from one another.

BACKGROUND

A customary method of machining sheet metal involves sheet metal parts initially being produced by cutting from a blank sheet, a skeleton surrounding the sheet metal parts being produced and also connecting webs between the sheet metal parts and the skeleton which are referred to as micro-joints. The micro-joints represent a temporary connection between the sheet metal parts and the skeleton and thereby ensure that after the cutting of the blank sheet, the sheet metal parts and the skeleton can be handled as a unit. In the case of the method known in the prior art, the cutting of the blank sheet is followed by a forming of the sheet metal parts produced during the blank sheet machining as an additional machining process. Forming means that the area across which the sheet metal parts extend in the plane of the machined blank sheet is reduced and the micro-joints, by means of which the sheet metal parts are connected to the skeleton, are lengthened and thereby plastically deformed. The gap between the formed sheet metal parts and the skeleton surrounding them is permanently greater than the gap between the unformed sheet metal parts and the skeleton.

SUMMARY

The invention relates to methods for machining plate-like workpieces from an elastically deformable material, in particular for machining sheet metal, wherein a separating method of the above kind is carried out and wherein following the incomplete and prior to the complete separation of the two workpiece parts, at least one of the workpiece parts is additionally machined.

An objective of the present invention is to develop methods of machining sheet metal parts in such a way that a workpiece part is partially or incompletely separated from another workpiece part and remains connected to the other workpiece part by at least one connecting web that retains a defined position with respect to the other workpiece part, particularly also irrespective of a machining-related force application.

In embodiments of the invention, the at least one connecting web via which the work-piece parts incompletely separated from one another are connected to one another is created as a flexure bearing that connects the two workpiece parts to one another in such a manner that the two workpiece parts are movable relative to one another with elastic deformation of the connecting web against the action of a re-storing force. The flexure bearing according to the invention is formed as such from material of the workpiece machined for separation. If the workpiece parts move, for example, due to additional machining following the separating machining starting from an initial position relative to one another, the flexure bearing produces an automatic resetting of the workpiece part or parts to the initial position. The joint function of a connecting web according to the invention configured as a flexure bearing results from the fact that the bending stiffness of the connecting web compared with the bending stiffness of the adjacent workpiece parts is reduced, the connecting web thus acting as a spring.

If, in the context of the machining method according to the invention, following the incomplete separation of two workpiece parts, one of the workpiece parts is additionally machined and this workpiece part alters its initial position with respect to the other workpiece part under the effect of the additional machining, the additionally machined workpiece part automatically returns to its initial position upon completion of the additional machining due to the elasticity of the connecting web or webs. This fact is important, particularly in applications in which following the incomplete separation of two workpiece parts, at least one of the workpiece parts undergoes a plurality of additional machining operations in sequence and a plurality of the additional machining operations are controlled taking account of the position adopted by the workpiece part to be machined following the incomplete separation with respect to the other workpiece part. In the event that the workpiece part to be machined leaves the position originally adopted with respect to the other workpiece part during an additional machining operation, the connecting web or webs configured as a flexure bearing ensure that the workpiece part once again adopts its initial position with respect to the other workpiece part following the additional machining and the next additional machining can therefore also be controlled, taking account of the initial position of the workpiece part to be machined.

For the incomplete separation of the two workpiece parts, the workpiece concerned can be machined in a different manner. According to the invention, workpiece machining can involve laser cutting. Alternatively, the connecting web or webs and/or the separating line between the two workpiece parts partially separated from one another can, however, also be created, for example, by punching, water jet cutting, or wire eroding, or by a combination of the aforementioned methods.

Connecting webs configured as flexure bearings are conceivable, for example between a single finished part created individually in the context of separating sheet metal machining and a skeleton from sheet metal machining, but also between a plurality of finished parts on the one hand and a skeleton on the other and/or for connecting a plurality of finished parts to one another.

Relative movability of the workpiece parts partially separated from one another with elastic deformation of the connecting web or webs configured as flexure bearings is produced by the methods according to the invention, particularly in a movement plane that extends parallel to a plate plane of the plate-like workpiece. Alternatively or in addition, the separating methods according to the invention may, however, also be carried out in such a manner that elasticity of the connecting web or webs is produced and there is a relative movability resulting from this of the workpiece parts partially separated from one another against the action of a restoring force perpendicular to the plate plane of the plate-like workpiece. It can be ensured where necessary that the degree of elasticity of the connecting web or webs parallel to the plate plane substantially exceeds the elasticity of the connecting web or webs perpendicular to the plate plane.

Different kinds of machining processes can be used in the new methods as additional machining operations following the incomplete separation of two work-piece parts, wherein forming of a workpiece part partially separated from another workpiece part is particularly relevant in practice. In certain embodiments, the separating methods according to the invention are used particularly in cases in which following the incomplete separation and prior to the complete separation of workpiece parts, at least one of the workpiece parts is additionally machined on a workpiece edge. For applications of this kind, the spring elasticity of the connecting web or webs between the workpiece parts partially separated from one another is of particular importance to the extent that a mutual deflection of the two work-piece parts partially separated from one another can above all be associated with edge machining. One example of edge machining is roller pinching to produce a bevel on the edge of at least one of the two workpiece parts. In the case of roller pinching, the workpiece part concerned is acted upon on its edge by a forming roller that rolls with a conical lateral surface along the edge of the workpiece to be formed and thereby produces an oblique surface on the edge of the workpiece part. At the start of machining, the forming roller is lowered perpendicularly to the plate plane of the workpiece onto the workpiece part to be machined and with the conical lateral surface applied under pressure to the edge of the workpiece part to be formed. Due to the spring elasticity of the connecting web or webs provided between the two workpiece parts, the workpiece part exposed to pressure may, where necessary, be automatically aligned with respect to the forming roller, without its position with respect to the other workpiece part thereby being permanently changed. Once the edge machining has been completed and the machined workpiece part relieved of pressure from the forming roller, the machined workpiece part automatically moves back into its initial position. In the initial position, the edge-machined workpiece part is arranged in a defined manner for further additional machining.

To provide the flexure bearing property and the elasticity associated therewith of the connecting web or webs, various procedures are provided according to the invention.

In some embodiments, a connecting web is created as the flexure bearing that has a larger cross section at its ends where it passes into the two workpiece parts than in a region provided between the ends. In this way, the elasticity of the connecting web is deliberately assigned to a particular extent to the region located between the ends of the connecting web.

In some embodiments, a connecting web is created according to the invention as the flexure bearing, which connecting web has the desired elasticity on account of its shape.

The creation of a connecting web with a V-shape has proved particularly advantageous in this case. The V-shape of the connecting web according to the invention is produced having two legs that are connected to one another by a transition region, converge towards the transition region and form an acute internal angle. Each of the legs is directly or indirectly attached at the leg end away from the transition region to one of the workpiece parts partially separated from one another (Patent Claim 4).

To guarantee a favorable elasticity behavior of the connecting web, the transition region of the V-shape of the connecting web in an advantageous embodiment of the separating method according to the invention is created with a cross section that is smaller in size compared with the cross section of the legs of the V-shape. In addition or alternatively, the connecting web is configured in such a manner that the legs of the V-shape of the connecting web form an internal angle of 5° to 45°, e.g., 10° to 30°. An internal angle that is not excessively small between the legs of the V-shape of the connecting web has the advantage, moreover, that material that has to be removed between the legs of the V-shape to create the V-shape of the connecting web can easily be removed from the intermediate space between the legs.

Likewise in the interests of a favorable elasticity behavior of the connecting web or webs configured as flexure bearings, in the case of the variant of the method according to the invention described in Patent Claim 6, a connecting web with a V-shape is created as the flexure bearing, the transition region whereof between the legs of the V-shape extends along a circular arc and thereby over a central angle, for example of more than 180°. A relatively large radius of the transition region gives the connecting web a particularly pronounced elasticity and prevents breakage of the transition region during the elastic deformation thereof.

In a further embodiment of the separating method according to the invention, a connecting web with a meandering shape is created as the flexure bearing (Patent Claim 7). The winding meandering shape also means that a favorable elasticity behavior of the connecting web is achieved. In particular, a connecting web with a meandering shape can form a softer spring and/or its length can undergo greater elastic change than a connecting web with a simple V-shape.

In some embodiments a connecting web with a meandering shape is configured as the flexure bearing. Accordingly, a connecting web with a meandering shape is created as the flexure bearing, which meandering shape comprises a V-shape and a further leg attached to the V-shape. The further leg, along with the leg of the V-shape adjacent to it, forms a further V-shape of the connecting web.

In some embodiments, with the incomplete separation of two work-piece parts a single connecting web is left between said parts, while in other embodiments, the two workpiece parts are partially separated from one another, leaving a plurality of connecting webs adjacent to one another. In some embodiments, the entire incomplete separation of the two workpiece parts is completed in one go.

In other embodiments, connecting webs adjacent to one another are partially created and the separating line running between connecting webs adjacent to one another is completely created in one go between the two workpiece parts. In the next step, one of the initially partially created connecting webs is completed by creating the second workpiece opening forming it and immediately following the aforementioned workpiece opening a separating line is created that produces contours of the two workpiece parts. Immediately adjacent to the aforementioned separating line, a further workpiece opening is created that, along with another workpiece opening, forms a further connecting web.

In some embodiments, the creation of the workpiece openings that form the connecting webs is divided into two separate method steps. Since only part of the separating line producing the contour of the workpiece openings is initially created, the region of the machined workpiece that fills the subsequent workpiece opening is initially still attached to one of the workpiece parts to be produced. Workpiece movements that have to be carried out following the partial creation of a work-piece opening for example to create a separating line producing contours of the two workpiece parts are consequently followed by the workpiece region filling the sub-sequent workpiece opening. If the workpiece openings were to be completely created from the outset, each of the workpiece cutouts thereby created would have to be removed immediately after its production, as otherwise there would be risk of the workpiece cutouts preventing subsequent workpiece movements.

In certain embodiments of the separating method according to the invention, different machining tools are used for the partial creation of the workpiece openings forming a connecting web and for the completion thereof. The separating lines that partially produce the contours of the workpiece openings can be created by laser cutting, while punching tools can be used to complete the workpiece openings.

In some embodiments, a process step is provided within the framework of the separating method according to the invention for the complete separation of the workpiece parts initially partially separated from one another. According to the invention, at least one cross-section reduction is initially produced on the connecting web or webs for this purpose, before the connection of the workpiece parts produced by the connecting web concerned is removed by separation at the cross-section reduction or reductions. The cross-section reduction of a connecting web ensures that the two workpiece parts can be separated from one another in a functionally reliable manner. In particular, a manual separation of the two workpiece parts can be facilitated in this manner.

There are different possibilities according to the invention for producing a cross-section reduction of a connecting web. Pressure-forming is particularly conceivable, for example, an embossing machining of the connecting web.

In an advantageous embodiment of the invention, the cross-section reduction of a connecting web is created on at least one end, e.g., on both ends, of the connecting web. In this case, the connecting web and the workpiece part adjacent thereto are directly separated from one another where the connecting web fits onto the workpiece part. When a suitable separating tool is used, no noticeable signs of the connecting web are left behind on the workpiece part and a good quality separating surface is produced on the workpiece part.

The invention is explained in greater detail with the help of exemplary schematic drawings.

DETAILED DESCRIPTION

Figure 1:
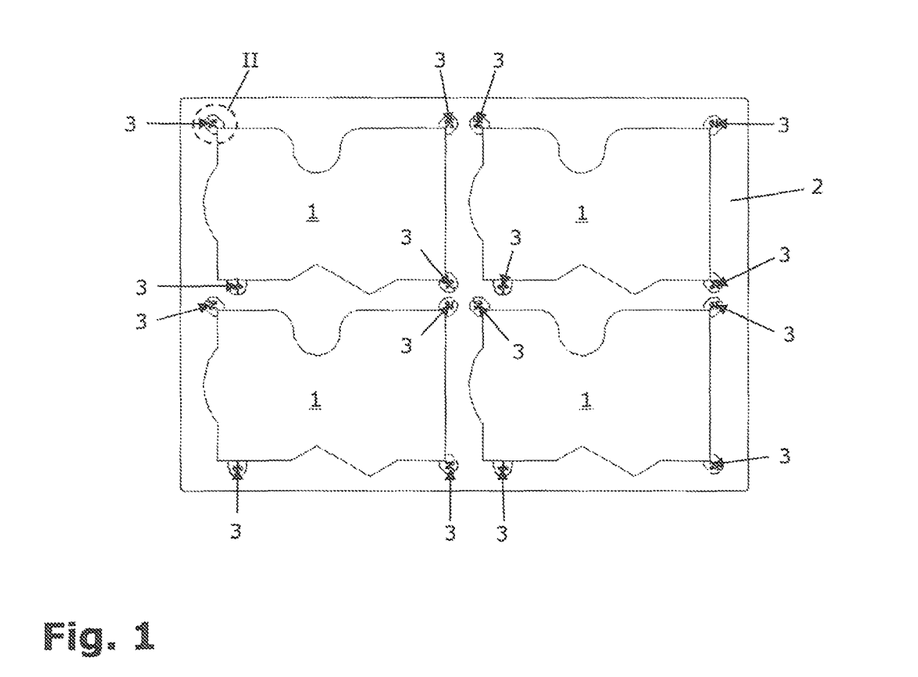
FIG. 1 is a schematic diagram that shows a machined sheet-metal plate with finished parts arranged within a skeleton and connected to the skeleton by connecting webs.

As can be seen from FIG. 1, workpiece parts in the form of finished parts 1, a skeleton 2, and also connecting webs 3 were produced by separating machining of a sheet-metal plate of an elastically deformable material. The connecting webs 3 connect the finished parts 1 and the skeleton 2 to one another. The connecting webs 3 were formed by leaving certain material during the separating machining of the sheet-metal plate. The finished parts 1 and the skeleton 2 are consequently partially separated from one another.

Figure 2:
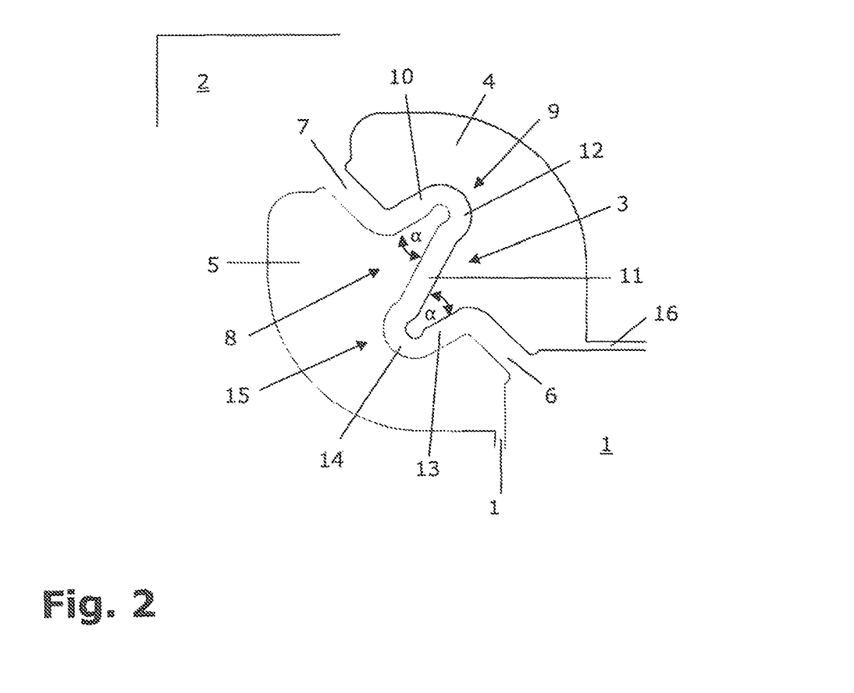
FIG. 2 shows the detail II in FIG. 1.

The configuration of the connecting webs 3 can be seen in detail from FIG. 2, in which the conditions at the upper left corner of the machined workpiece or of the machined sheet-metal plate in FIG. 1 are depicted on an enlarged scale. The other connecting webs 3 on the machined sheet-metal plate conform in principle, in terms of their configuration, to the connecting web 3 depicted in FIG. 2.

The connecting web 3 is formed out of the material of the sheet-metal plate. The connecting web 3 is formed by two workpiece openings 4, 5 that have been created spaced apart from one another on the sheet-metal plate. Rectilinear ends 6, 7 of the connecting web 3 permit the connecting web 3 to fit on the one hand to one of the finished parts 1 and, on the other hand, to the skeleton 2. In a region 8 between the ends 6, 7, the connecting web 3 has a meandering configuration. The region 8 comprises a V-shape 9 with legs 10, 11, a transition region 12 connecting the legs to one another and also a further leg 13 that is connected by a further transition region 14 to the leg 11 of the V-shape 9 adjacent to it. Along with the leg 11 of the V-shape 9 adjacent to it and the other transition region 14, the further leg 13 forms another V-shape 15 of the connecting web 3.

The transition region 12 of the V-shape 9 and the other transition region 14 of the other V-shape 15 extend between the legs 10, 11; 11, 13 along a circular arc in each case that extends over a central angle of roughly 250°. The legs 10, 11 and also the legs 11, 13 form an internal angle α that is roughly 30° in the example. The transition region 12 of the V-shape 9 and the other transition region 14 of the other V-shape 15 have a smaller cross section than the adjacent legs 10, 11, 13.

Based on the design described, the connecting web 3 made of the material of the machined sheet-metal plate exhibits an elasticity in a plate plane of the machined sheet-metal plate extending parallel to the drawing plane in FIG. 2 and thereby forms a flexure bearing. Since the ends 6, 7 of the connecting web 3 have a greater cross section and consequently a greater bending stiffness than the winding region 8 between the ends 6, 7, the meandering region 8 of the connecting web 3 acts primarily in a resilient manner.

According to FIG. 1, each of the finished parts 1 is attached by four connecting webs 3 and therefore by four flexure bearings to the skeleton 2 of the machined sheet-metal plate. Due to the elasticity of the connecting webs 3, the finished parts 1 may change their position with respect to the skeleton 2 against the action of a restoring force.

In FIG. 2, one of the finished parts 1 is shown in the initial position with respect to the skeleton 2. If the finished part 1 is deflected from the initial position parallel to the plate plane of the machined sheet-metal plate, the connecting webs 3 provided between the finished part 1 and the skeleton 2 are elastically deformed while changing the internal angle α between the legs 10, 11, 13 of the V-shape 9 and the other V-shape 15. Due to the resetting of the elastically deformed connecting web 3 to the initial state, the finished part 1 deflected from the initial position automatically returns to the initial position. The extent of the play by which the finished parts 1 are attached to the skeleton 2 is determined by the width of separating lines 16 that can to some extent be seen in FIG. 2 between the finished parts 1 and the skeleton 2.

In the example shown, the conditions according to FIG. 1 are the result of separating machining of a sheet-metal plate by laser cutting and punching. The machining sequence is illustrated in detail in FIGS. 3 to 5, wherein FIGS. 3 and 4 show parts of the paths along which a laser beam used for laser cutting and the sheet-metal plate to be machined move in the plate plane of the sheet-metal plate relative to one another, to partially separate the finished part arranged at the top left in FIG. 1 from the skeleton 2.

The separating machining of the sheet-metal plate is carried out on a traditional combined punch laser machine and is numerically controlled. The relative movement of the sheet-metal plate and laser beam for the separating machining of the sheet-metal plate is produced by moving the sheet-metal plate relative to a laser cutting head of the combined punch laser machine directing the laser beam towards the sheet-metal plate. To this end, the sheet-metal plate is fixed to a traditional coordinate guide of the combined punch laser machine and moved by means of the coordinate guide over a workpiece support of the machine. The sheet-metal plate in this case is held by means of clamping claws of the coordinate guide, wherein the clamping claws grip the sheet-metal plate in the region of the skeleton 2.

In the coordinate system of the numerical control of the combined punch laser machine, the instantaneous position of the sheet-metal plate is defined via the instantaneous position of the coordinate guide. Since the coordinate guide grips the sheet-metal plate in the region of the skeleton 2 by means of the clamping claws, the instantaneous position of the coordinate guide stands for the instantaneous position of the skeleton 2. The instantaneous position of the finished parts 1 arranged within the skeleton 2 is determined by the numerical control of the combined punch laser machine with the help of the instantaneous position of the coordinate guide or of the skeleton 2, taking account of an assignment plan stored in the numerical control, from which the distribution of the finished parts 1 over the sheet-metal plate results.

Figure 3:
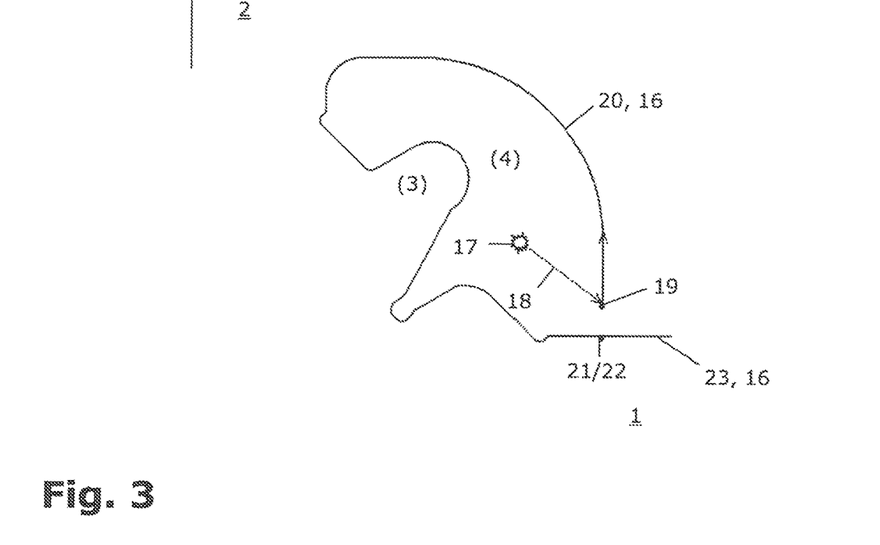
FIG. 3, FIG. 4 and FIG. 5 are schematic representations that illustrates the separating method for producing the machined sheet-metal plate according to FIG. 1.
Figure 4:
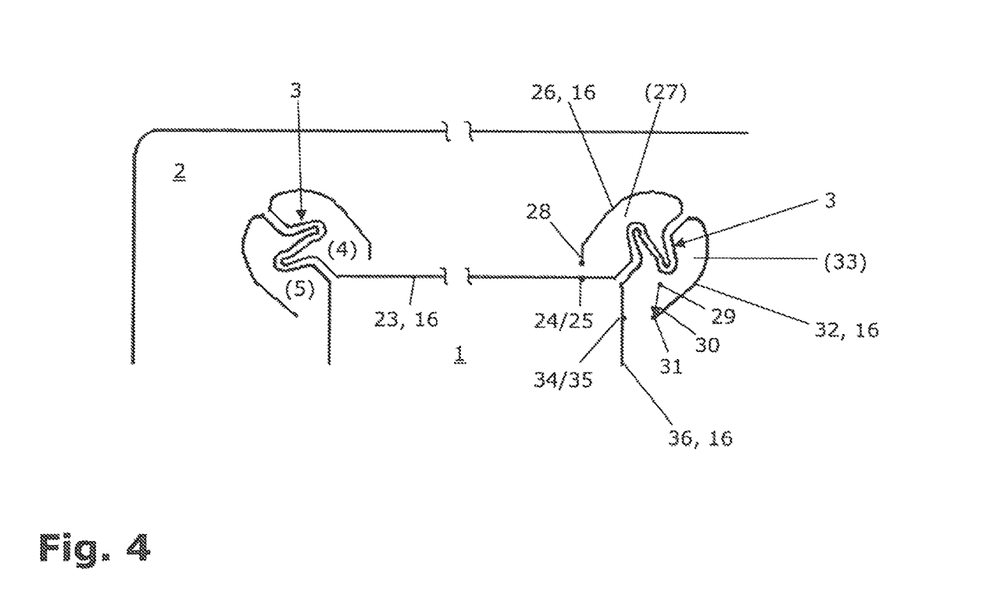

As is evident from FIG. 3, the separating machining of the sheet-metal plate begins with the laser beam emitted by the laser cutting head of the combined punch laser machine at a piercing site 17 piercing the sheet-metal plate. The piercing site 17 lies within the subsequent workpiece opening 4 on the first connecting web 3 that can be seen in FIG. 1 at the upper left corner of the finished part 1 arranged on the upper left side.

Starting from the piercing site 17, the laser beam is moved along a first path section 18 to a starting point 19 that lies on a contour line 20 of the workpiece opening 4. From the starting point 19, the laser beam moves down the contour line 20 of the workpiece opening 4. During this, the laser beam produces through a separating line 16 in each case part of the contour of the workpiece opening 4 and the contour of the first connecting web 3. The contour line 20 of the workpiece opening 4 ends in an endpoint 21 that simultaneously forms a starting point 22 of a contour line 23 of the finished part 1 and the skeleton 2.

The laser beam passes over the endpoint 21 or the starting point 22 without interruption and moves directly adjacent to the contour line 20 of the workpiece opening 4 down the contour line 23 of the finished part 1 and of the skeleton 2. In this case, the laser beam produces contours of the finished part 1 and of the skeleton 2 through a further separating line 16.

According to FIG. 4, the laser beam is guided along the contour line 23 until it reaches an endpoint 24 of the contour line 23. The endpoint 24 of the contour line 23 is simultaneously a starting point 25 of a contour line 26 of a workpiece opening 27 that, for its part, forms a second connecting web 3 adjacent to the first connecting web 3.

The laser beam 4 passes over the endpoint 24 or starting point 25 without interruption and moves down the contour line 26 as far as an endpoint 28. In this way, the laser beam produces immediately adjacent to the separating line 16 producing contours of the finished part 1 and of the skeleton 2, a separating line 16 that in each case produces part of the workpiece opening 27 and the second connecting web 3.

Just as with the starting point 19 of the contour line 20 of the workpiece opening 4, the endpoint 28 of the contour line 26 of the workpiece opening 27 is also spaced apart from the contour line 23 of the finished part 1 and of the skeleton 2. The separating lines 16 that produce in part the contours of the workpiece openings 4, 27 therefore begin or end at a distance from the separating line 16 producing contours of the finished part 1 and of the skeleton 2. As a consequence, the regions of the sheet-metal plate arranged within the contour lines 20, 26 or the corresponding separating lines 16 initially remain connected to the subsequent skeleton 2.

On reaching the endpoint 28 of the contour line 26 of the workpiece opening 27, the laser beam is switched off. The machined sheet-metal plate is then moved by means of the coordinate guide of the combined punch laser machine relative to the laser cutting head thereof, until the laser cutting head is positioned above a piercing site 29. The laser beam is then switched on again and pierces the sheet metal plate at the piercing site 29. Starting from the piercing site 29, the laser beam is moved along a first path section 30 as far as a starting point 31 of a contour line 32 of a workpiece opening 33. Through the separating line 16 produced, the workpiece opening 33, which along with the workpiece opening 27 forms the second connecting web 3, is partially produced. The second connecting web 3 is completed by the separating line 16 running along the contour line 32.

The contour line 32 of the workpiece opening 33 ends at an endpoint 34 that simultaneously forms a starting point 35 of a contour line 36. The contour line 36 describes the course of a separating line, through which contours of the finished part 1 and of the skeleton 2 are produced. The laser beam also passes over the endpoint 34 or the starting point 35 without interruption and creates a separating line 16 directly adjacent to the separating line 16 extending along the contour line 32 of the workpiece opening 33 that produces contours of the finished part 1 and of the skeleton 2.

During its movement along the contour line 36, the laser beam reaches an endpoint of the contour line 36 lying outside the representation in FIG. 4 that at the same time forms the starting point of a contour line of the third connecting web 3 and another workpiece opening-forming the third connecting web 3. In FIG. 1, the third connecting web 3 can be recognized in the lower right corner of the finished part 1 arranged top left. The sequences that then follow correspond to the sequences involved when moving down the contour line 26 of the workpiece opening 27. A separating line is created that partially produces a contour of the third connecting web 3 and a contour of one of the workpiece openings forming the third connecting web 3. The laser beam is then switched off and following another repositioning movement of the machined sheet-metal plate, the laser beam pierces the sheet-metal plate on the opposite side of the third connecting web 3. Sequences follow that correspond to the sequences described above during the partial production of the workpiece opening 33. The second of the workpiece openings forming the third connecting web 3 is partially created; the third connecting web 3 is completed.

In the manner described, the two workpiece openings forming the fourth connecting web 3 (in the lower left corner of the finished part 1 arranged top left in FIG. 1) are then partially created and the fourth connecting web 3 is completely created. The laser beam finally reaches the first connecting web 3 that can be seen in FIG. 1. The first connecting web 3 is completely produced through the creation of a corresponding separating line 16; the workpiece opening 5 forming the first connecting web 3 along with the workpiece opening 4 is partially produced.

Figure 5:
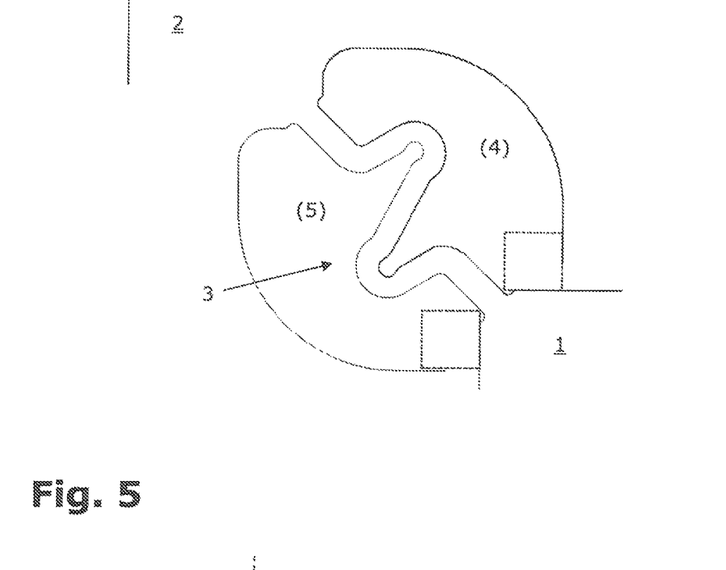

The workpiece regions that fill the workpiece openings provided to form the connecting webs 3 are all still connected to the skeleton 2. This connection is made in workpiece regions proximate to the connecting webs 3. In FIG. 5, the workpiece regions located at the first connecting web 3 are framed by a dotted line. Due to the continuing attachment of the workpiece regions filling the workpiece openings to the skeleton 2, no workpiece cutouts had to be removed during the course of the machining of the sheet-metal plate hitherto. Instead, the workpiece regions framed by the contour lines of the workpiece openings were able to follow the movements of the sheet-metal plate relative to the laser cutting head of the combined punch laser machine to be performed in order to machine the sheet-metal plate. This means that hitherto neither time-consuming unloading actions were necessary nor were the movements of the sheet-metal plate to be machined relative to the laser cutting head of the combined punch laser machine impeded by free workpiece cutouts.

Finally, the residual connections between the workpiece regions filling the workpiece openings and the skeleton 2 are removed. To this end, the sheet-metal plate is moved to the punching station of the combined punch laser machine, where all residual connections between the workpiece regions filling the workpiece openings and the skeleton 2 are punched out by means of a corresponding punching tool.

Now, the sheet-metal plate is in the machining state shown in FIG. 1. The finished parts 1 and the skeleton 2 are partially separated from one another; the connecting webs 3 configured as flexure bearings create a temporary resilient connection between the finished parts 1 and the skeleton 2.

The separating machining of the sheet-metal plate is followed by additional machining. In this case, the finished parts 1 produced during the separating machining of the sheet-metal plate undergo edge machining.

The additional machining is also carried out at the punching station of the combined punch laser machine. Here, the recently used punching tool is exchanged for a forming tool, in the present example for a roller pinching tool 37. The roller pinching tool 37 comprises a forming roller 38 depicted in FIG. 6, which is introduced into the upper workpiece holder on the punching station of the combined punch laser machine. Assigned to the forming roller 38 is a bearing not shown in the illustrations that is mounted on the lower tool holder of the combined punch laser machine.

The forming roller 38 of the roller pinching tool 37 is provided with a double-conical bead 39 that has two conical forming surfaces 40, 41. The conical forming surfaces 40, 41 are mirror-symmetrical in relation to a central plane of the double conical bead 39 indicated by a dotted line in FIG. 6.

Figure 6:
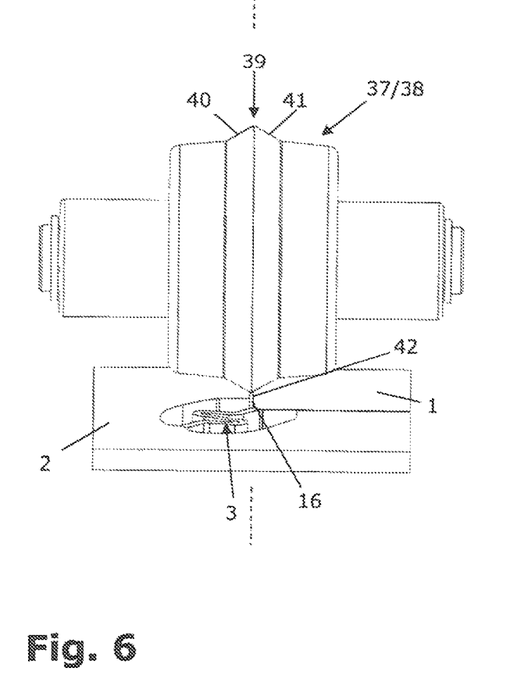
FIG. 6 and FIG. 7 are schematic diagrams that show the machined sheet-metal plate according to FIG. 1 during and after additional edge machining of the finished parts.
Figure 7:
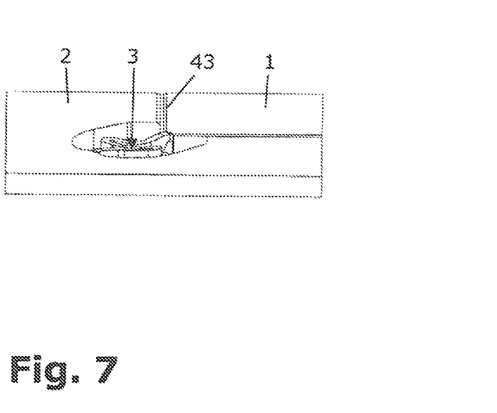

To perform the additional machining, the sheet-metal plate is initially positioned in the machining state according to FIG. 1 by means of the coordinate guide of the combined punch laser machine with respect to the roller punching tool 37 introduced into the punching station of the combined punch laser machine. Numerically controlled, the machined sheet-metal plate is arranged in such a manner in this case that the longitudinal center plane of a separating line 16 extending between the finished part 1 to be machined and the skeleton 2 coincides with the center plane of the double-conical bead 39 of the forming roller 38. The forming roller 38 is then lowered onto the machined sheet-metal plate and the conical forming surface 41 is applied under pressure onto a workpiece edge 42 to be formed of the finished part 1 that is to be machined. The machined sheet-metal plate is then moved by means of the coordinate guide of the combined punch laser machine in such a way that the forming roller 38 rotatably mounted on the stationary tool holder of the punching station of the combined punch laser machine rolls along the workpiece edge 42 to be formed of the finished part 1 and in so doing produces a bevel 43 on the finished part 1 (FIGS. 6, 7). The finished part 1 in this case is supported on the underside by the bearing not shown of the roller pinching tool 37.

The positioning of the machined sheet-metal plate before the start of the additional machining by means of the roller pinching tool 37 and also the movement of the machined sheet-metal plate during the edge forming on the finished part 1 is controlled by the numerical control of the combined punch laser machine based on the data stored in the control system. However, these control data do not take account of unforeseeable production tolerances on the machined sheet-metal plate, for example, such as an unwanted wrong positioning of the finished part 1 to be machined with respect to the skeleton 2, due to a heat-related material distortion during the separating laser machining of the sheet-metal plate. It is therefore conceivable that following the initial positioning of the sheet-metal plate to be additionally machined with respect to the roller pinching tool 37, the longitudinal center plane of the separating line 16 limited by the workpiece edge 42 to be machined is offset laterally with respect to the center plane of the double conical bead 39 on the forming roller 38 of the roller pinching tool 37.

If in a case of this kind the forming roller 38 is applied with the conical forming surface 41 to the workpiece edge 42 of the finished part 1 to be machined, the finished part 1 can be automatically aligned due to its movability relative to the skeleton 2 with respect to the double conical bead 39 of the forming roller 38 and thereby balance out the offset that initially exists between the longitudinal center plane of the separating line 16 and the center plane of the double conical bead 39 of the forming roller 38. In a corresponding manner, the finished part 1 can be automatically adjusted during the rolling movement of the forming roller 38 along the workpiece edge 42 with respect to the forming roller 38.

Due to the elasticity of the connecting webs 3, the deflection of the finished part 1 from the initial position with respect to the skeleton 2 associated with the automatic alignment of the finished part 1 with respect to the forming roller 38 is not permanent. Instead, the spring elasticity of the connecting webs 3 means that the finished part 1 automatically moves back into its initial position once the workpiece edge 42 has been formed and once the finished part 1 has been relieved of pressure from the forming roller 38.

This aspect is particularly important when, following the forming of the workpiece edge 42, the finished part 1 is to be provided with a bevel on further workpiece edges, for example initially on a workpiece edge extending perpendicular to the workpiece edge 42. If this workpiece edge was also arranged from the outset to deviate from the desired position with respect to the skeleton 2 and if the connecting webs 3 were permanently deformed during the automatic alignment of the finished part 1 associated with the edge machining, an uncontrollable chain of positional inaccuracies would result that would substantially affect the accuracy of the edge machining of the finished part 1.

Upon completion of the edge machining of all finished parts 1, the finished parts 1 and the skeleton 2 must be completely separated from one another. To this end, the connecting webs 3 are each initially provided with a cross-section reduction between the finished parts 1 and the skeleton 2 at their ends 6, 7. This process step is also carried out at the punching station of the combined punch laser machine. A forming tool 44 is used in this case and comprises a hollow cylindrical forming stamp 45 in the upper tool holder of the combined punch-laser machine and a workpiece support in the lower workpiece holder of the combined punch laser machine. On the side facing the workpiece, the wall of the hollow cylindrical forming stamp 45 is provided with an inwardly extending bevel. Accordingly, the edge of the hollow cylindrical forming stamp 45 acting on the workpiece to be formed has a trapezoidal cross section.

Figure 8:
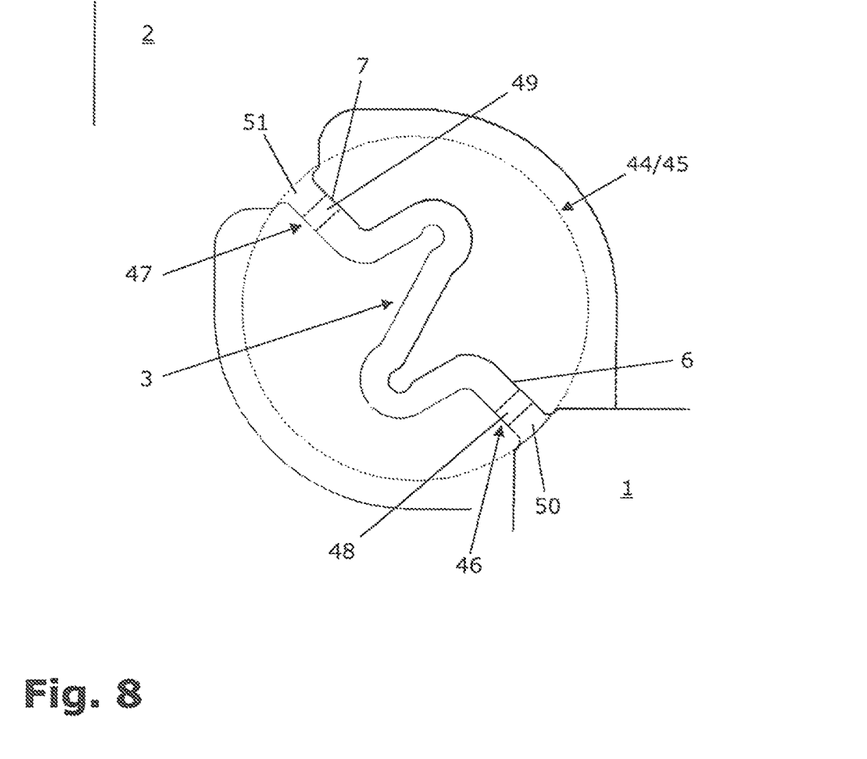
FIG. 8 is a schematic representation that illustrates the complete separation of the finished part from the skeleton of the machined sheet-metal plate according to FIG. 1.

The perpendicular projection of the axis-parallel outer lateral surface of the hollow cylindrical forming stamp 45 on a connecting web 3 is indicated by a dotted line in FIG. 8. Accordingly, the diameter of the hollow cylindrical forming stamp 45 is precisely adjusted to the dimensions of the connecting web 3 to be machined.

By means of the coordinate guide of the combined punch laser machine, the machined sheet-metal plate is positioned with the edge-machined finished parts 1 with respect to the forming tool 44 in such a manner that the mutual arrangement of the forming stamp 45 of the forming tool 44, on the one hand, and the connecting web 3 to be machined, on the other, as shown in FIG. 8 results.

The connecting web 3 is then acted upon by lowering the forming stamp 45 with the free end thereof. In this way, the connecting web 3 is provided at the ends 6, 7 with cross-section reductions 46, 47 indicated by dotted lines in FIG. 8. Due to the trapezoidal cross section of the edge of the forming stamp 45 acting on the connecting web 3, the cross-section reductions 46, 47 at the connecting web 3 have oblique surfaces 48, 49 and horizontal base surfaces 50, 51, wherein the oblique surfaces 48, 49 slope with respect to the horizontal.

Finally, the connecting web 3 is separated from the finished part 1 and the skeleton 2 at the cross-section reductions 46, 47. The separation may take place manually. It is also conceivable, however, for separating tools to be used. For example, the connection between the connecting web 3, on the one hand, and the finished part 1 and also the skeleton 2, on the other, can be severed by means of a laser beam in the region of the base surfaces 50, 51 of the cross-section reductions 46, 47 of the connecting web 3. In each case, care must be taken that at most slight traces of the connecting web 3 are left behind on the finished part 1 during the separation.

Figure 9:
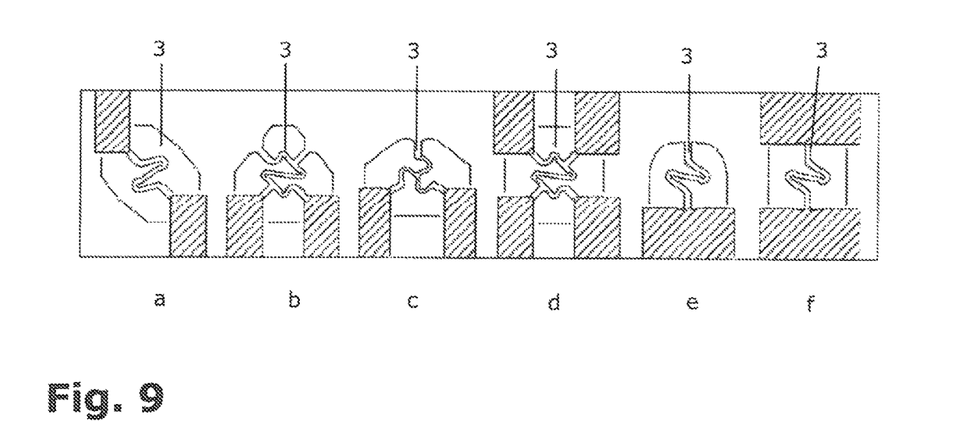
FIG. 9 is a top schematic diagram that shows possibilities for attaching finished parts by means of connecting webs that differ from the machining case according to FIG. 1.

Contrary to the situation depicted in FIG. 1, it is also particularly possible for a plurality of finished parts to be attached to a skeleton by means of a common elastic connecting web and/or for finished parts to be connected to one another by one or a plurality of elastic connecting webs. By way of example, machining cases of this kind are shown in FIG. 9. Finished parts that are partially separated from one another and/or from a skeleton are reproduced with hatching in this case.

From left to right, FIG. 9 shows connecting webs for the corner attachment of two finished parts to one another (example a), for the corner attachment of two finished parts to a skeleton (examples b, c), for the corner attachment of four finished parts to one another (example d), for the edge attachment of a finished part to a skeleton (example e) and for the edge attachment of two finished parts to one another (example f).

Other Embodiments

A number of embodiments of the invention have been described. Nevertheless, it will be understood that various modifications may be made without departing from the spirit and scope of the invention. Accordingly, other embodiments are within the scope of the following claims.

What is claimed is:

1. A method for separating machining of sheet metal from an elastically deformable material, wherein two sheet metal parts are separated from one another, the method comprising:
producing at least one elastically deformable connecting web connecting the two sheet metal parts to one another by partially separating the two sheet metal parts from one another; and
removing the at least one elastically deformable connecting web by using a separating tool to completely separate the two sheet metal parts from one another, wherein the at least one elastically deformable connecting web is removed by punching, laser cutting, water jet cutting or wire eroding or by a combination of the aforesaid methods,
wherein the at least one elastically deformable connecting web is produced by partially separating the two sheet metal parts from one another as a flexure bearing having a connecting web shape configured to connect the two sheet metal parts to one another in such a manner that the two sheet metal parts are configured to move relative to one another with elastic deformation of the connecting web shape against action of a restoring force,
wherein the connecting web shape comprises a first leg and a second leg connected to one another by a first transition region,
wherein connecting web shape further comprises a third leg connected the second leg by a second transition region,
wherein the first and the second legs converge towards the first transition region to form a first acute internal angle ($\alpha$), the first and the second legs and the first transition region thus forming a first V-shape and the second and the third legs converge towards the second transition region to form a second acute internal angle ($\alpha$), the second and third legs and the second transition region thus forming a second V-shape,
wherein the first leg of the first V-shape is connected by a first leg end to a first sheet metal part of the two sheet metal parts,
wherein the third leg of the second V-shape is connected by a second leg end to a second sheet metal part of the two sheet metal parts and
wherein the first transition region and the second transition region each comprise a circular arc and the circular arc of each of the first transition region and the second transition region extends over a central angle of the circular arc, which central angle is greater than 180°.

2. The method according to claim 1, wherein the connecting web is produced as a flexure bearing that passes into a first one of the two workpiece parts at a first end of the flexure bearing and into a second one of the two workpiece parts at a second end of the flexure bearing and wherein the flexure bearing has a greater cross section at the first end and the second end than in a region provided between the first end and the second end.

3. A method according to claim 1, wherein the two workpiece parts are completely separated from one another, in that a cross-section reduction of the connecting web is initially produced on the at least one connecting web, before the connection of the workpiece parts produced by the connecting web is removed by separation at the cross-section reduction.

4. The method according to claim 3, wherein the cross-section reduction of the connecting web is initially produced on at least one end of the connecting web, before the connection of the workpiece parts produced by the connecting web is removed by separation at the cross-section reduction.

5. The method according to claim 1, wherein the first transition region and the second transition region are each created with a cross section that is smaller in size compared with the cross section of each of the first leg, the second leg, and the third leg.

6. The method according to claim 1, wherein the first and the second acute internal angles ($\alpha$) are each in a range of 5° to 45°.

7. The method according to claim 1, wherein the first and the second acute internal angles ($\alpha$) are each in a range of 10° to 30°.

8. The method according to claim 1, wherein the two workpiece parts are partially separated from one another so as to produce a single connecting web and such that two spaced apart workpiece openings are created, the workpiece openings limiting the connecting web, wherein a first one of the workpiece openings is created initially, wherein a separating line is created immediately adjacent to the one of the workpiece openings that produces contours of the two workpiece parts and wherein the other of the workpiece openings is created immediately adjacent to the separating line.

9. The method according to claim 1, wherein the two workpiece parts are partially separated from one another, so as to produce connecting webs adjacent to one another at a distance, wherein workpiece openings are created on the workpiece that are spaced apart from one another in pairs, limiting a connecting web, wherein one of the workpiece openings is created initially that limits a first of the connecting webs, wherein a separating line is created immediately adjacent to the one of the workpiece openings that produces contours of the two workpiece parts and wherein one of the workpiece openings is created immediately adjacent to the separating line that limits a connecting web adjacent to the first connecting web.

10. The method according to claim 1, wherein the two workpiece parts are partially separated from one another so as to produce a single connecting web, in that two workpiece openings spaced apart from one another and limiting the connecting web are created on the workpiece, wherein one of the workpiece openings is partially created initially and in this case to the extent of a separating line partially producing a contour of the workpiece opening and of the connecting web in each case, wherein immediately adjacent to the separating line partially producing the contour of the workpiece opening and of the connecting web in each case, a separating line is created that produces contours of the two workpiece parts, wherein directly adjacent to the separating line producing the contours of the two workpiece parts, the other of the workpiece openings is partially created, to the extent of a separating line partially producing a contour of the other workpiece opening and completing the contour of the connecting web and wherein, finally, the initially partially created workpiece openings are completed.

11. The method according to claim 1, wherein the two workpiece parts are partially separated from one another, so as to produce connecting webs adjacent to one another at a distance, in that workpiece openings are created on the workpiece that are spaced apart from one another in pairs, limiting a connecting web, wherein one of the workpiece openings that limit a first of the connecting webs is partially created initially and in this case to the extent of a separating line partially producing a contour of the workpiece opening and of the connecting web in each case, wherein immediately adjacent to the separating line partially producing the contour of the workpiece opening and of the connecting web in each case, a separating line is created that produces contours of the two workpiece parts, wherein directly adjacent to the separating line producing the contours of the two workpiece parts, one of the workpiece openings that limit a second connecting web adjacent to the first connecting web is partially created, and in this case to the extent of a separating line partially producing a contour of the workpiece opening and of the second connecting web in each case, wherein the other of the workpiece openings that limit the second connecting web is then produced, to the extent of a separating line partially producing a contour of the other workpiece opening and completing the contour of the second connecting web, wherein a separating line is created directly adjacent to the separating line partially producing the contour of the other workpiece opening and completing the contour of the second connecting web, that produces contours of the two workpiece parts, wherein finally a separating line is created directly adjacent to a separating line producing contours of the two workpiece parts that partially produces a contour of the second workpiece opening delimiting the first connecting web and completes the contour of the first connecting web and wherein, finally, the initially partially created workpiece openings are completed.

* * * * *